United States Patent
Bonilla et al.

(10) Patent No.: US 9,251,517 B2
(45) Date of Patent: Feb. 2, 2016

(54) OPTIMIZING SERVICE FACTORS FOR COMPUTING RESOURCES IN A NETWORKED COMPUTING ENVIRONMENT

(75) Inventors: Milton A. Bonilla, Carmel, NY (US); Soobaek Jang, Hamden, CT (US); Thanh T. Pham, San Jose, CA (US); Dmitry Rekesh, Castro Valley, CA (US); Peter P. Rodriguez, Pleasanton, CA (US); Kathleen H. Sittler, Delray Beach, FL (US); Brian J. Snitzer, Lancaster, PA (US)

(73) Assignee: International Business Machines Corporation, Armonk, NY (US)

( * ) Notice: Subject to any disclaimer, the term of this patent is extended or adjusted under 35 U.S.C. 154(b) by 376 days.

(21) Appl. No.: 13/596,569

(22) Filed: Aug. 28, 2012

(65) Prior Publication Data
US 2014/0068075 A1   Mar. 6, 2014

(51) Int. Cl.
*G06F 15/173*  (2006.01)
*G06Q 30/00*  (2012.01)
*H04L 12/24*  (2006.01)

(52) U.S. Cl.
CPC .............. *G06Q 30/00* (2013.01); *H04L 41/0823* (2013.01); *H04L 41/12* (2013.01); *H04L 41/145* (2013.01); *G06F 2209/501* (2013.01); *H04L 41/5019* (2013.01)

(58) Field of Classification Search
CPC ....................................................... H04L 41/12
USPC ................................................ 709/223, 226
See application file for complete search history.

(56) References Cited

U.S. PATENT DOCUMENTS

| 7,574,496 | B2 | 8/2009 | McCrory et al. |
| 2010/0088150 | A1* | 4/2010 | Mazhar et al. ................. 705/10 |
| 2010/0274983 | A1 | 10/2010 | Murphy et al. |
| 2010/0332818 | A1* | 12/2010 | Prahlad et al. ...... G06F 17/3002 713/150 |

(Continued)

OTHER PUBLICATIONS

Mell et al., "The NIST Definition of Cloud Computing", National Institute of Standards and Technology, Information Technology Laboratory, Version 15, Oct. 7, 2009, 2 pages.*

(Continued)

*Primary Examiner* — Wing F Chan
*Assistant Examiner* — Andrew Woo
(74) *Attorney, Agent, or Firm* — Noah A. Sharkan; Hunter E. Webb; Keohane & D'Alessandro PLLC

(57) ABSTRACT

An approach is provided for optimizing service factors for computing resources in a networked computing environment. Specifically, under one approach, a cloud broker/aggregator, a cloud offering optimizer, and a user workload optimizer may be provided. The cloud aggregator may aggregate information/data pertaining to a set of service factors associated with a set of resources distributed among a set of deployment groups (e.g., cloud pods). The cloud offering optimizer may analyze this information and may determine a reallocation plan to optimize values of the service factors associated with the set of resources. The user workload optimizer may then receive the reallocation plan from the cloud offering optimizer and/or application event information, and modify the deployment topology accordingly.

22 Claims, 10 Drawing Sheets

(56) References Cited

U.S. PATENT DOCUMENTS

| | | |
|---|---|---|
| 2011/0137805 A1 | 6/2011 | Brookbanks et al. |
| 2011/0138048 A1 | 6/2011 | Dawson et al. |
| 2011/0138050 A1 | 6/2011 | Dawson et al. |
| 2011/0145380 A1 | 6/2011 | Glikson et al. |
| 2011/0179232 A1 | 7/2011 | Schindler |
| 2011/0246627 A1 | 10/2011 | Kern |
| 2011/0289119 A1 | 11/2011 | Hu et al. |
| 2012/0011190 A1 | 1/2012 | Driesen et al. |
| 2013/0007088 A1* | 1/2013 | Alfredo et al. ........ G06F 9/5066 709/201 |

OTHER PUBLICATIONS

Maitland, J., "Keeping Control Isn't Easy", Chapter 4: Cloud-Based Infrastructure, SearchCloudComputing.com, 13 pages. No publication date cited in the article.

Yoo, C., "Cloud Computing: Architectural and Policy Implications", Technology Policy Institute, Jan. 2011, 20 pages.

Maitland, J., "Keeping Control Isn't Easy", Chapter 4: Cloud-Based Infrastructure, SearchCloudComputing.com, Publication Date: Oct. 2009, 17 pages.

* cited by examiner

OPTIMIZING SERVICE FACTORS FOR COMPUTING RESOURCES IN A NETWORKED COMPUTING ENVIRONMENT

TECHNICAL FIELD

Embodiments of the present invention relate to the optimization of service factors (e.g., price, quality of service (QoS), etc.) pertaining to computing resources (e.g., cloud computing resources) distributed over a set of deployment groups/units (e.g., cloud computing pods).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Many of today's cloud computing environments may include multiple cloud units deployed in different geographic locations. Users may request resources from each of the groups based on certain performance requirements and/or needs. Challenges may exist, however, in providing an approach for managing cloud resources in a manner that optimizes the value for both the cloud users as well as for cloud providers.

SUMMARY

Embodiments of the present invention provide an approach for optimizing service factors (e.g., price, quality of service (QoS), etc.) for computing resources (e.g., cloud computing resources) in a networked computing environment (e.g., a cloud computing environment). Specifically, in a typical embodiment, a cloud broker/aggregator, a cloud offering optimizer, and a user workload optimizer may be provided. The cloud aggregator may aggregate information/data pertaining to a set of service factors associated with a set of resources distributed among a set of deployment groups (e.g., cloud pods). Such information may comprise (among other things) workload information, event data, pricing information, QoS information, resource capacity and/or availability information, current deployment topology information, etc. The cloud offering optimizer may analyze this information and may determine a reallocation plan to optimize values of the service factors associated with the set of resources. The user workload optimizer may then receive the reallocation plan from the cloud offering optimizer and/or application event information, and modify the deployment topology accordingly.

A first aspect of the present invention provides a computer-implemented method for optimizing service factors for computing resources in a networked computing environment, comprising: receiving information in a computer memory medium pertaining to a set of resource events having a potential to affect a set of service factors for a set of computing resources distributed among a set of deployment groups of the networked computing environment; determining a set of values for the set of service factors based on the information and a deployment topology of the set of computing resources among the set of deployment groups; determining a reallocation plan for the set of computing resources to optimize the set of values; and optimizing the deployment topology based on the reallocation plan and a set of application events corresponding to a set of applications utilized to process a set of workloads received by the networked computing environment.

A second aspect of the present invention provides a system for optimizing service factors for computing resources in a networked computing environment, comprising: a memory medium comprising instructions; a bus coupled to the memory medium; and a processor coupled to the bus that when executing the instructions causes the system to: receive information in a computer memory medium pertaining to a set of resource events having a potential to affect a set of service factors for a set of computing resources distributed among a set of deployment groups of the networked computing environment; determine a set of values for the set of service factors based on the information and a deployment topology of the set of computing resources among the set of deployment groups; determine a reallocation plan for the set of computing resources to optimize the set of values; and optimize the deployment topology based on the reallocation plan and a set of application events corresponding to a set of applications utilized to process a set of workloads received by the networked computing environment.

A third aspect of the present invention provides a computer program product for optimizing service factors for computing resources in a networked computing environment, the computer program product comprising a computer readable storage media, and program instructions stored on the computer readable storage media, to: receive information in a computer memory medium pertaining to a set of resource events having a potential to affect a set of service factors for a set of computing resources distributed among a set of deployment groups of the networked computing environment; determine a set of values for the set of service factors based on the information and a deployment topology of the set of computing resources among the set of deployment groups; determine a reallocation plan for the set of computing resources to optimize the set of values; and optimize the deployment topology based on the reallocation plan and a set of application events corresponding to a set of applications utilized to process a set of workloads received by the networked computing environment.

A fourth aspect of the present invention provides a method for deploying a system for optimizing service factors for computing resources in a networked computing environment, comprising: providing a computer infrastructure being operable to: receive information in a computer memory medium pertaining to a set of resource events having a potential to affect a set of service factors for a set of computing resources distributed among a set of deployment groups of the networked computing environment; determine a set of values for the set of service factors based on the information and a deployment topology of the set of computing resources among the set of deployment groups; determine a reallocation plan for the set of computing resources to optimize the set of values; and optimize the deployment topology based on the reallocation plan and a set of application events corresponding to a set of applications utilized to process a set of workloads received by the networked computing environment.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION

Figure 1:
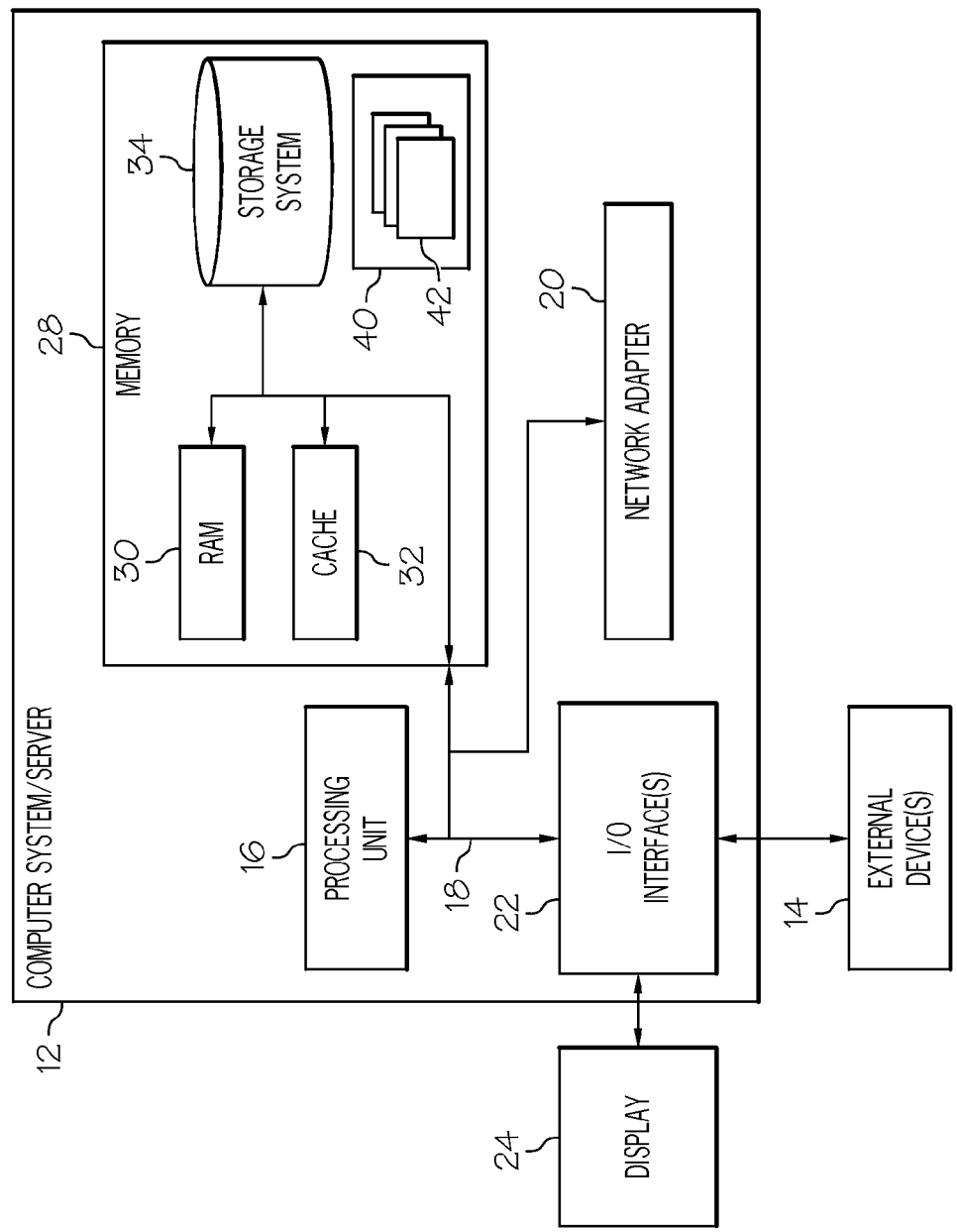
FIG. 1 depicts a cloud computing node according to an embodiment of the present invention.

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. The phrase "service factor" is intended to mean any type of factor that relates to the delivery and/or operation of a particular computing resource. Examples of service factors may include (but are not limited to): workload information, event handling, pricing/cost, QoS, resource capacity and/or availability, current deployment topology performance, etc.

Embodiments of the present invention provide an approach for optimizing service factors (e.g., price, quality of service (QoS), etc.) for computing resources (e.g., cloud computing resources) in a networked computing environment (e.g., a cloud computing environment). Specifically, in a typical embodiment, a cloud broker/aggregator, a cloud offering optimizer, and a user workload optimizer may be provided. The cloud aggregator may aggregate information/data pertaining to a set of service factors associated with a set of resources distributed among a set of deployment groups (e.g., cloud pods). Such information may comprise (among other things) workload information, event data, pricing information, QoS information, resource capacity and/or availability information, current deployment topology information, etc. The cloud offering optimizer may analyze this information and may determine a reallocation plan to optimize values of the service factors associated with the set of resources. The user workload optimizer may then receive the reallocation plan from the cloud offering optimizer and/or application event information, and modify the deployment topology accordingly.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
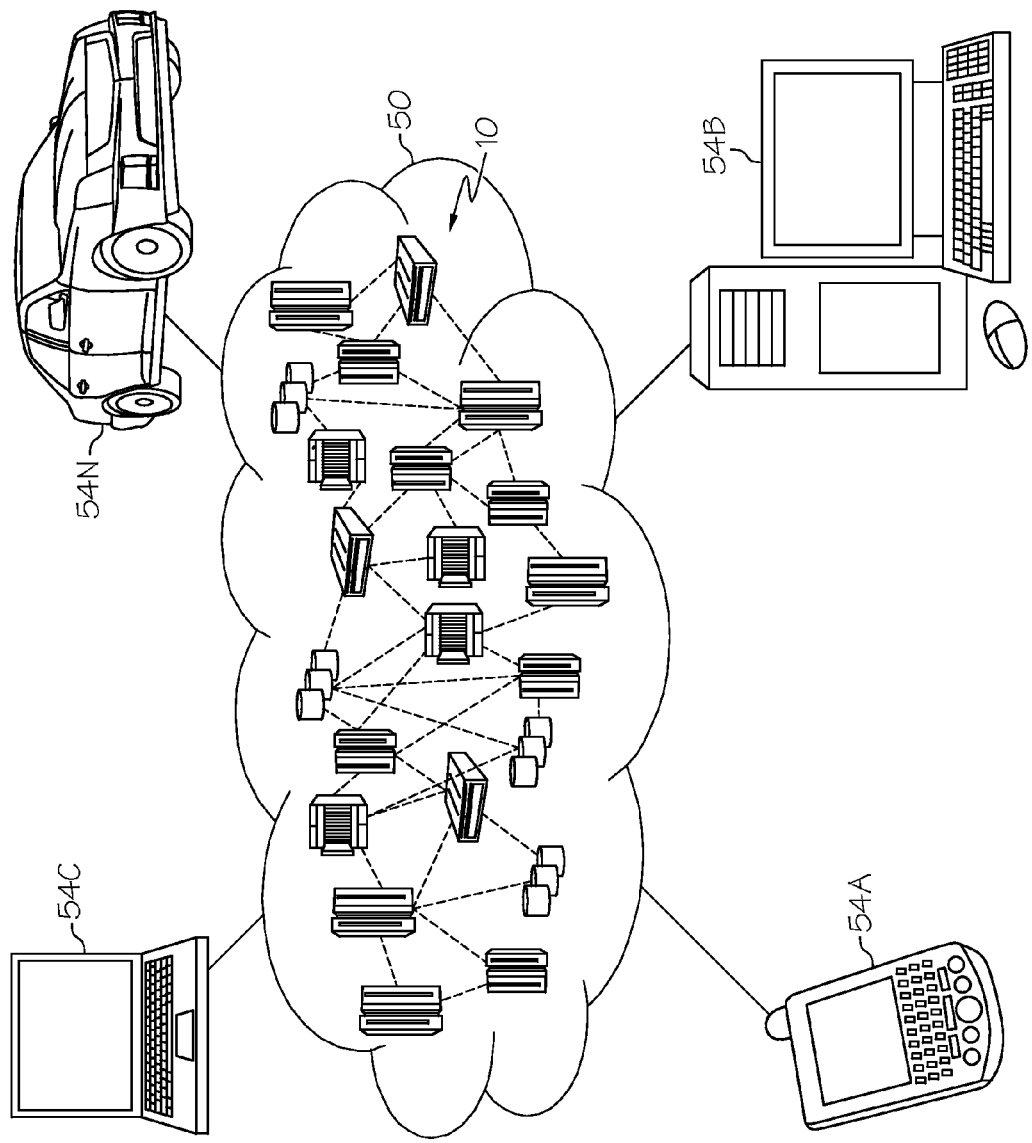
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
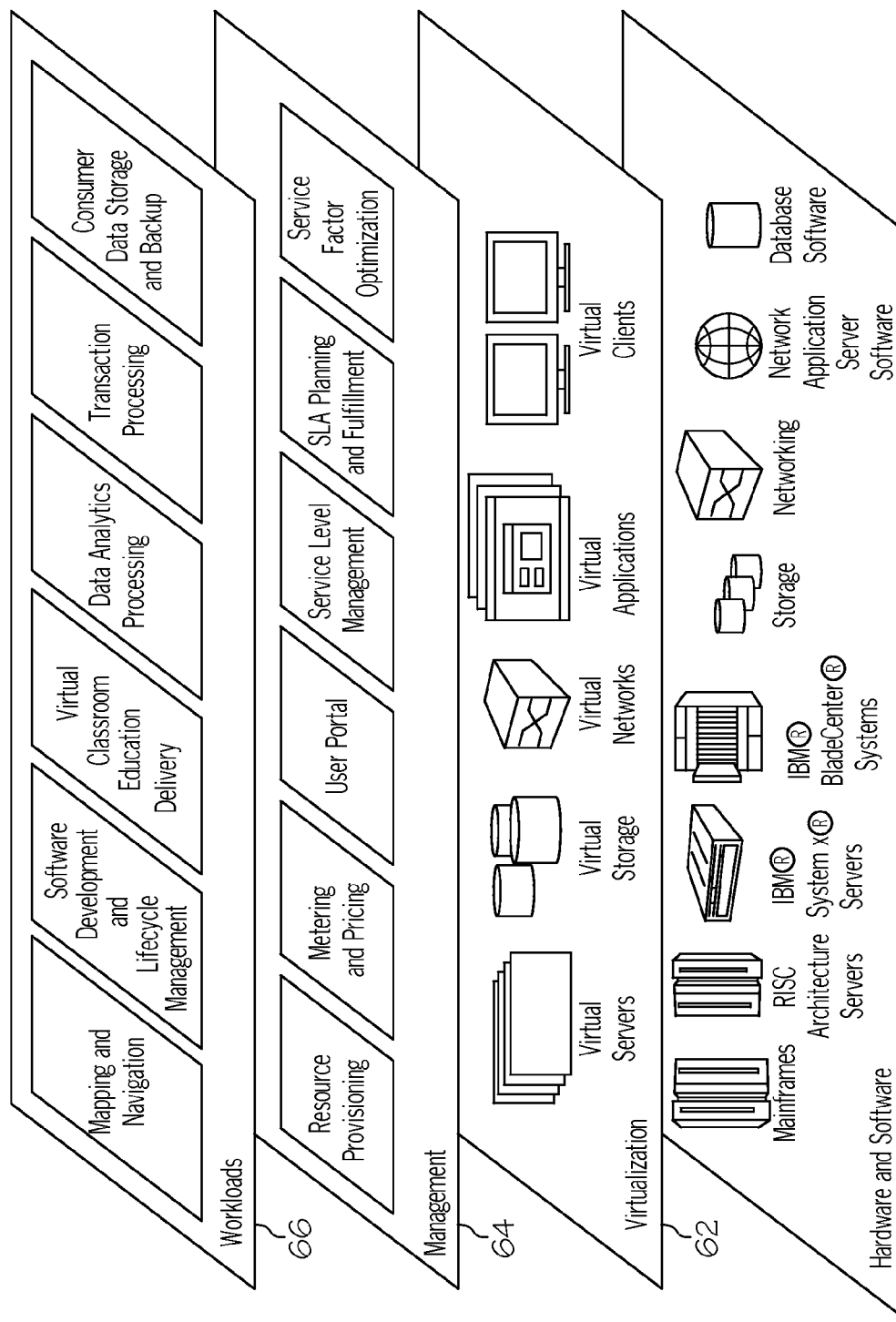
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is service factor optimization, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the service factor optimization functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

As indicated above, embodiments of the present invention provide an approach for providing an optimal QoS to users at a best pricing level. It is noted that each cloud resource in each of the cloud pods is associated with a deployment "constraints" descriptor, which contains a multi-dimensional combination of acceptable QoS metrics for the resource as well as an acceptable price range. A constraint may refer to the geographical location of the resource (e.g., Belgium), or to its QoS relative to another resource (e.g., latency between a pair of specified VMs should be less than 20 ms). It is further noted that the cloud resource is free to move (or be moved) between physical nodes, racks, or cloud pods as long as the constraints specified in its deployment descriptor are met.

In a cloud computing implementation, embodiments of the present invention may enable deployment groups (e.g., "cloud pods") to communicate a certain set of events that have a potential impact on service factors such as a QoS, price, etc. Historical information pertaining to cloud resource utilization may be utilized in order to enable predictive analytics. As will be further described below, embodiments of the present invention thus provide (among other things) a user workload optimizer and a cloud offering optimizer. The cloud offering optimizer may receive information pertaining to cloud pod events, and adjusts the price and QoS of cloud pod offerings. The cloud offering optimizer may also remap the computing resources between hardware units in the same pod or even across pods if needed in order to preserve QoS without affecting price. The cloud workload optimizer may receive the changes to the offering price and QoS, as well as the changes to the application environment, and optimizes the deployment topology by moving resources between the cloud pods, if necessary. These components thus coordinate with one another to maximize the overall value to the end user and the cloud provider. Long-term planning may be facilitated by the cloud offering optimizer performing analytics on the historical and current demand for resources in different pods. As an example, it may be determined that one of pods should be scaled down, another one increased in its capacity, or that a new pod with a given confluence of QoS and price be created.

In order to maximize the value to a cloud provider as well as to a cloud customer, the embodiments of the present invention may utilize a "constraints" cloud resource deployment descriptor, a distributed decision making platform, as well as an automated recommendation engine for long-term planning of the cloud pods. Embodiments of the present invention may further provide a level of transparency into environment optimization, and allow for the managing of multiple geographically distributed pods and their associated workloads. To a cloud provider, these embodiments may provide a consistent, optimized way to evolve a mix of cloud resources and associated locations. To a cloud user, these embodiments may provide an automated way of achieving desired cost and/or QoS targets for an application/topology, as well as on an individual resource level.

Figure 4:
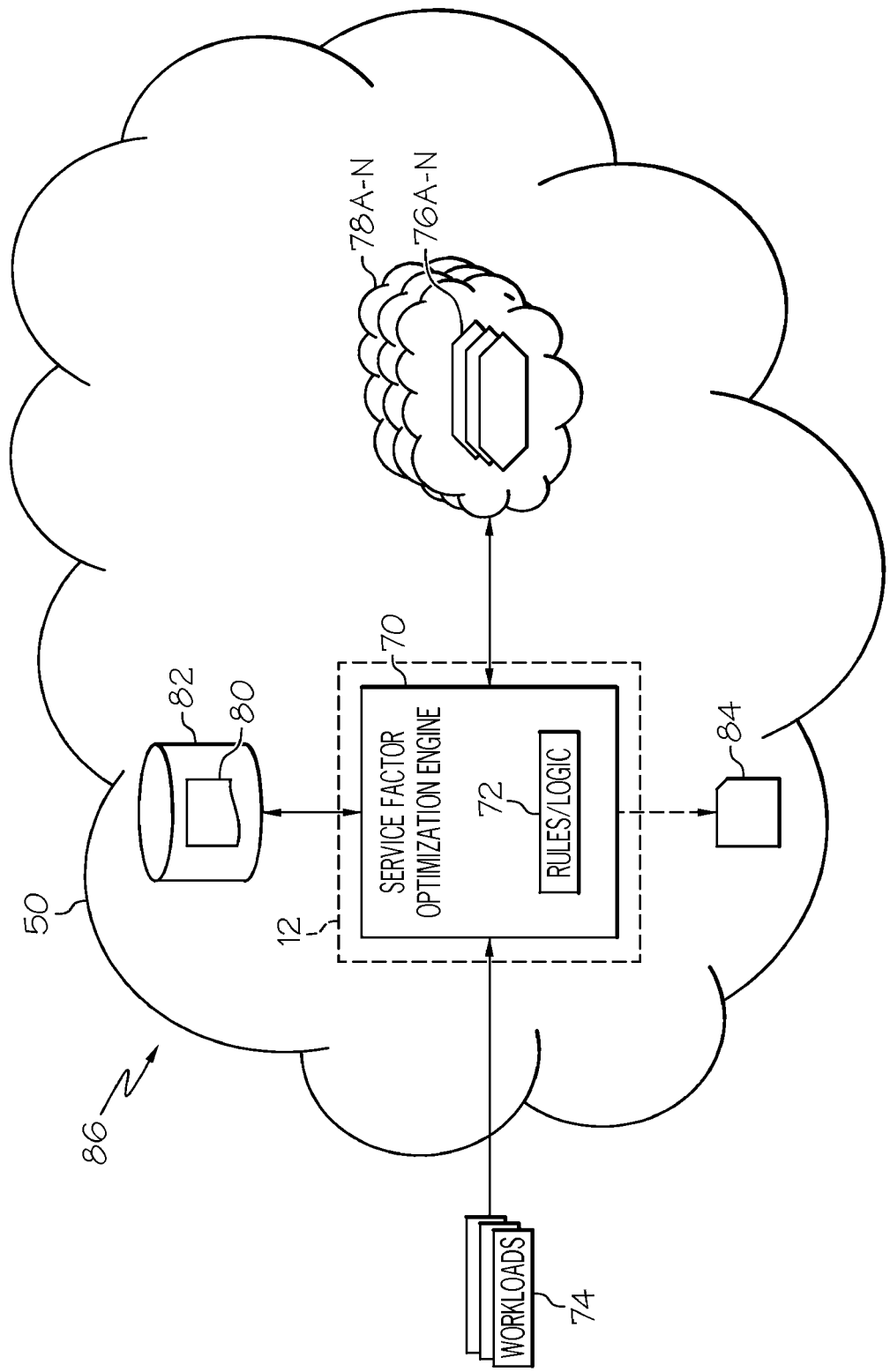
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 86 (e.g., a cloud computing environment 50). A computer system/server 12, which can be implemented as either a stand-alone computer system or as a networked computer system is shown in FIG. 4. In the event the teachings recited herein are practiced in a networked computing environment 86, each client need not have a service factor optimization engine (engine 70). Rather, engine 70 could be loaded on a server or server-capable device that communicates (e.g., wirelessly) with the clients to provide service factor optimization therefor. Regardless, as depicted, engine 70 is shown within computer system/server 12. In general, engine 70 can be implemented as program/utility 40 on computer system 12 of FIG. 1 and can enable the functions recited herein. As further shown, engine 70 (in one embodiment) comprises a rules and/or computational engine that processes a set (at least one) of rules/logic 72 and/or provides service factor optimization hereunder.

Along these lines, engine 70 may perform multiple functions similar to a general-purpose computer. Specifically, among other functions, engine 70 may (among other things): receive information (based on a set of historical data 80 stored in a computer storage device 82, or a set of workloads 74 to be processed by networked computing environment 86) in a computer memory medium pertaining to a set of resource events having a potential to affect a set of service factors (e.g., a price, or a quality of service (QoS) associated with utilization of a set of computing resources 66A-N) for a set of computing resources 76A-N distributed among a set deployment groups 78A-N (e.g., cloud pods) of the networked computing environment 86; determine a set of values for the set of service factors based on the information and a deployment topology of the set of computing resources among the set of groups of the networked computing environment; determine a reallocation plan 88 for the set of computing resources 76A-N to optimize the set of values; and optimize the deployment topology based on the reallocation plan 84 (e.g., to reallocate one or more computing resources within a deployment group and/or between deployment groups) and a set of application events corresponding to a set of applications (e.g., computing resources 76A-N) utilized to process the set of workloads 74.

Illustrative Examples

FIGS. 5-9 depict various illustrative examples describing embodiments of the present invention. It is understood that embodiments of the present invention are not intended to be limited to the details contained in FIGS. 5-9. Rather, the similar applications of the teachings recited herein may be provided.

Figure 5:
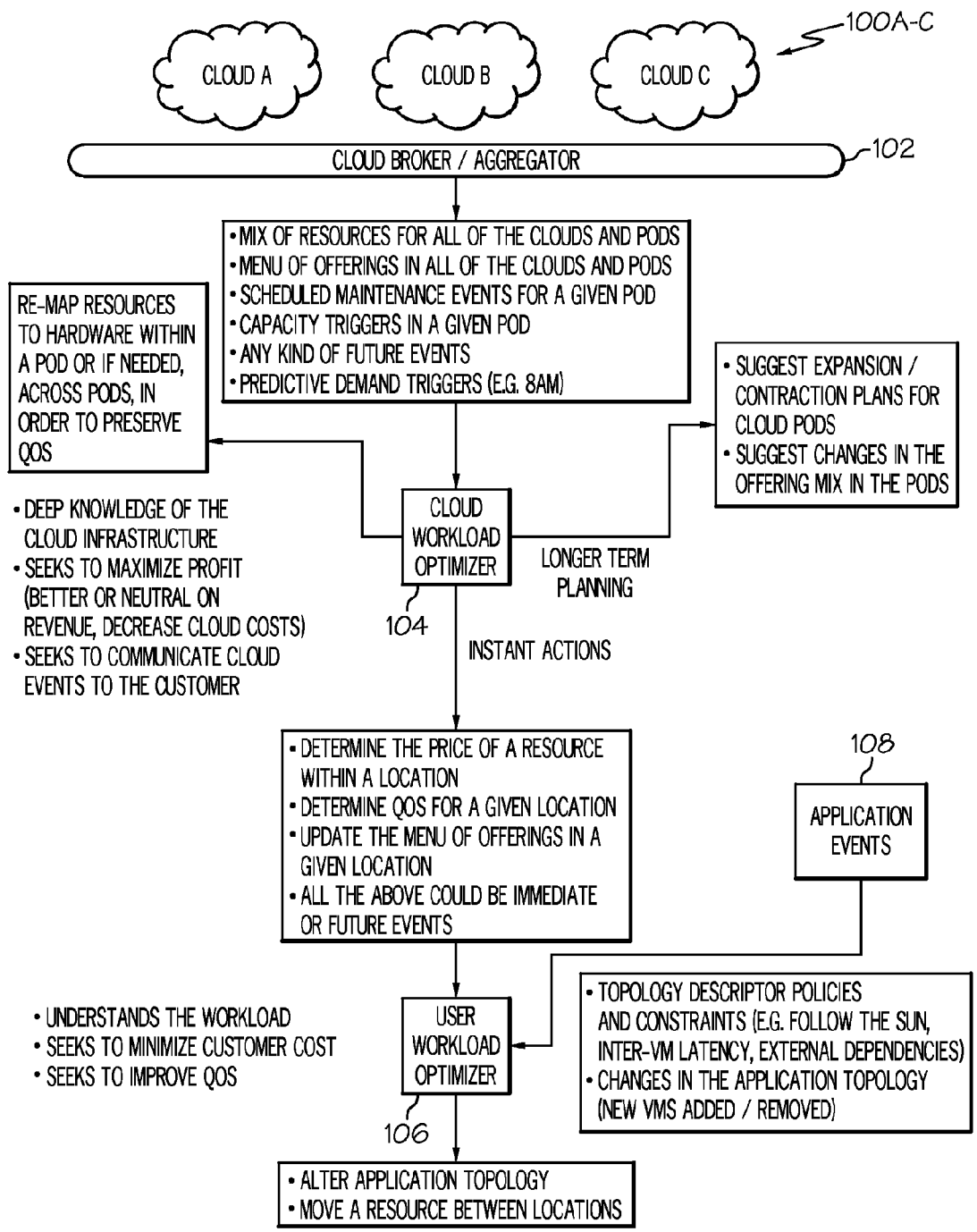
FIG. 5 depicts a component model diagram according to an embodiment of the present invention.

FIG. 5 provides a high level component model diagram. As depicted, cloud pods 100A-C communicate with cloud broker/aggregator 102, cloud offering optimizer 104, and user workload optimizer 106. In general, the cloud offering optimizer 104 may have full visibility into the relevant events of cloud pods 100A-C, as well as corresponding workload characteristics. In real time, cloud offering optimizer 104 may be configured to adjust service factors such as pricing and QoS for cloud resources, as well as to move resources within a pod or even across multiple pods without having to communicate much of the underlying data (much of which may be proprietary) to the cloud users. Longer term, cloud offering optimizer 104 may analyze a demand for cloud resources and be further configured to extrapolate this demand into the future, calculating an adjustment to the size of the cloud pods and resource "offering mix". User workload optimizer 106 may react to events discovered and/or analyzed by the cloud offering optimizer 104 as well as to other application events 108, and adjust the placement of the resources (e.g., the deployment topology) accordingly.

Regardless, as shown, cloud offering optimizer 104 may receive a set of information/data from cloud pods 100A-C via cloud broker/aggregator 102. Such information may comprise a mix of resources for clouds and/or pods 100A-C, a menu of offerings for clouds pods 100A-C, scheduled maintenance service for pods 100A-C, capacity triggers for pods 100A-C, predicted/future events 100A-C, predictive demand triggers, etc. Cloud offering optimizer 104 may utilize a deep knowledge base of the cloud infrastructure to: maximize profits for customers and/or communicate cloud events to customers. In any event, cloud offering optimizer 104 may (immediately or in the future) determine a price for a particular resource within a particular location, determine a quality of service for a particular location, and/or update a menu of offerings in a particular location. Cloud offering optimizer 104 may also re-map resources to hardware within a pod 100A-C, or across pods 100A-C in order to preserve QoS. Still yet, cloud offering optimizer 104 may determine expansion/contraction plans for cloud pods 100A-C, changes to the offering mix in pods 100A-C, etc. In general, the various determinations made by cloud offering optimizer 104 may be represented in an allocation plan (e.g., allocation plan 84 of FIG. 4) or the like.

As further shown, user workload optimizer 106 may receive the various segments of information and/or determinations (e.g., the reallocation plan) from cloud offering optimizer 104 as well as information related to application events 108 (e.g., topology descriptor policy constraints). This will allow user workload optimizer 106 to analyze the workloads, and work towards its goal of minimizing customer cost and improving QoS. Specifically, user workload optimizer 106 may optimize/alter/modify the deployment topology to provide improved service factor values.

Figure 6:
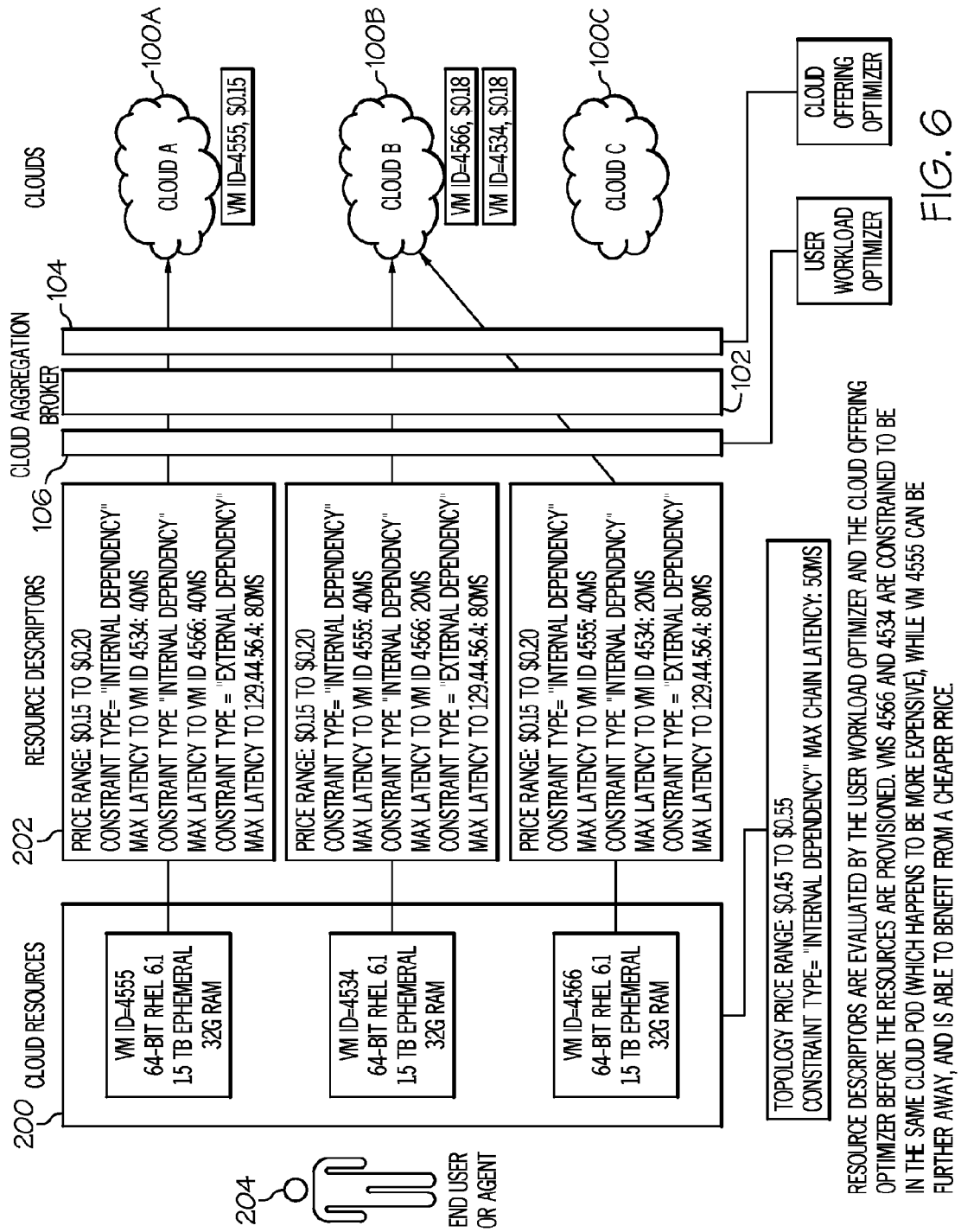
FIG. 6 depicts a provision-time use case diagram according to an embodiment of the present invention.

FIG. 6 illustrates a process flow during resource provisioning. As shown, an end user/customer 204 may wish to leverage various cloud resources 200 that are provided via cloud pods 100A-C. As further shown, each cloud resource 200 may have an associated resource descriptor 202 that defines attributes such as (price ranges, constraint types, etc.). In any event, user workload optimizer 106 may evaluate the constraints listed in the resource descriptors 202 and compute/determine an optimal deployment location (e.g., topology) for each of the cloud resources 200 (e.g., among to cloud pods 100A-C). It is noted that QoS constraints may pre-empt the lowest price configuration. A similar flow may be executed: when a resource is added to the application or deployment topology, when an update is received from the cloud offering optimizer, and/or at regular intervals so as to capture a potentially changing QoS with respect to external dependencies (such as external non-cloud servers). For example, resource descriptors 202 may be evaluated by user workload optimizer 106 and cloud offering optimizer 104 before cloud resources 200 are provisioned. In the example shown, virtual machines (VMs) 4566 and 4534 may be constrained to be in the same cloud pod, while VM 4555 may be moved further away and able to benefit from a less expensive pricing configuration.

Figure 7:
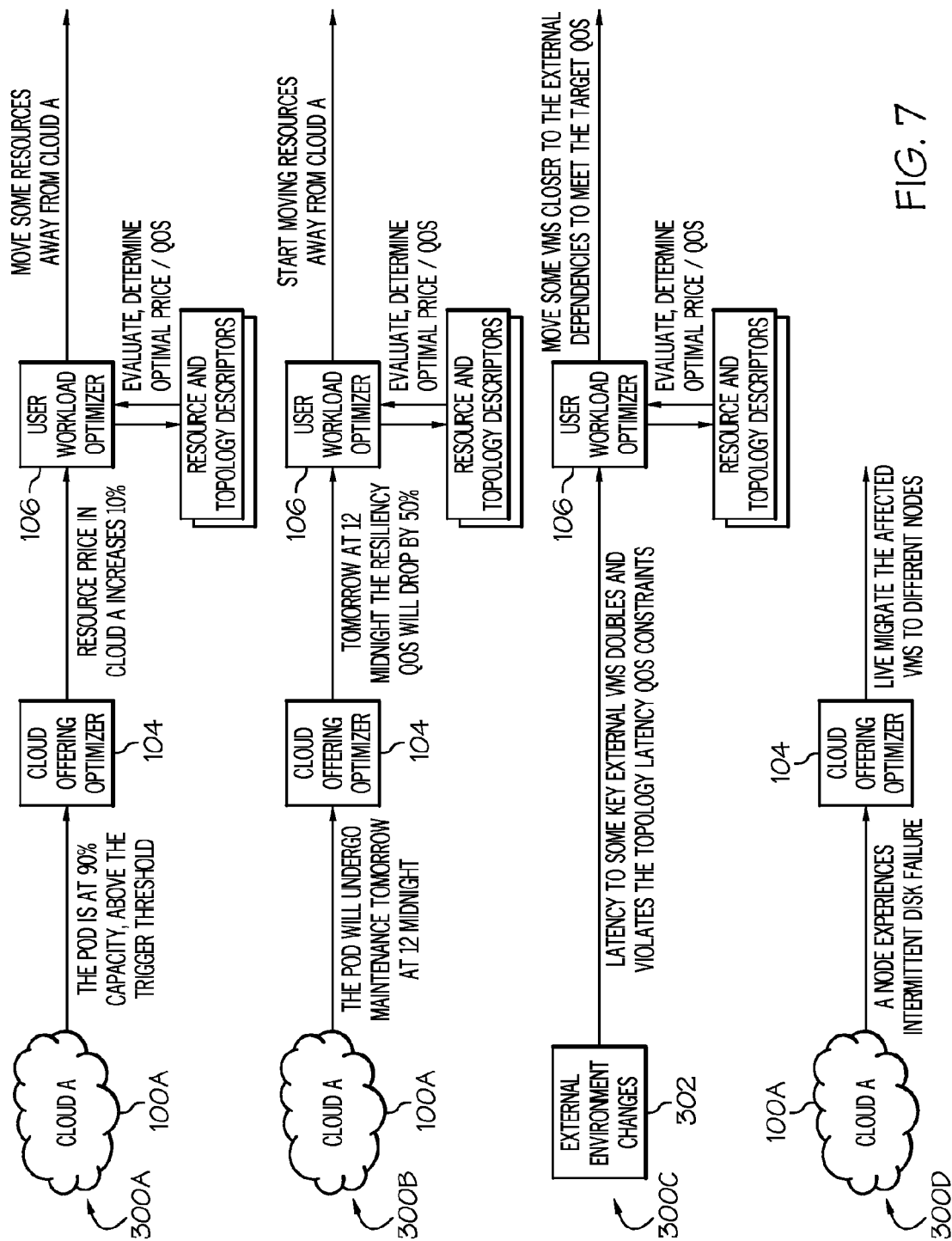
FIG. 7 depicts a run-time use case according to an embodiment of the present invention.

FIG. 7 provides further examples of process flow diagrams 300A-D in which cloud offering optimizer 104 and/or user workload optimizer 106 may coordinate with one another. It is noted that the cloud offering optimizer 104 need not communicate internal cloud events with a user/customer. Moreover, user workload optimizer 106 need not communicate any of the application events to the cloud pods.

In process flow 300A, it is determined that cloud pod 100A is at 90% capacity (i.e., above a trigger threshold). In response, cloud offering optimizer 104 may increase the resource price in cloud A by 10% and communicate related information to user workload optimizer 106. User workload optimizer 106 may receive resource and topology descriptors, evaluate optimal price/QoS, and move resources away from cloud pod 100A to reserve the best price/QoS combination.

In process flow 300B, it is determined that cloud pod 100A will undergo a scheduled maintenance "tomorrow at midnight." In response, cloud offering optimizer 104 may note/plan for the QoS to drop by 50% at that time, and communicate related information to user workload optimizer 106. User workload optimizer 106 may receive resource and topology descriptors, evaluate optimal price/QoS, and move resources away from cloud pod 100A to preserve the best price/QoS combination.

In process flow 300C, it is determined that external environmental changes 302 resulted in a doubling of latency to some external VMs, which may violate topology latency QoS constraints. In response, user workload optimizer 106 may receive resource and topology descriptors, evaluate optimal price/QoS, and move VMs closer to the external dependencies to meet the required QoS.

In process flow 300D, it is determined that a node in cloud pod 100A experiences intermittent disk failure. In response, cloud offering optimizer 104 may plan or execute a live migration of the affects VMs have on different nodes (e.g., within cloud pod 100A, or to another cloud pod such as cloud pods 100B and/or 100C).

Figure 8:
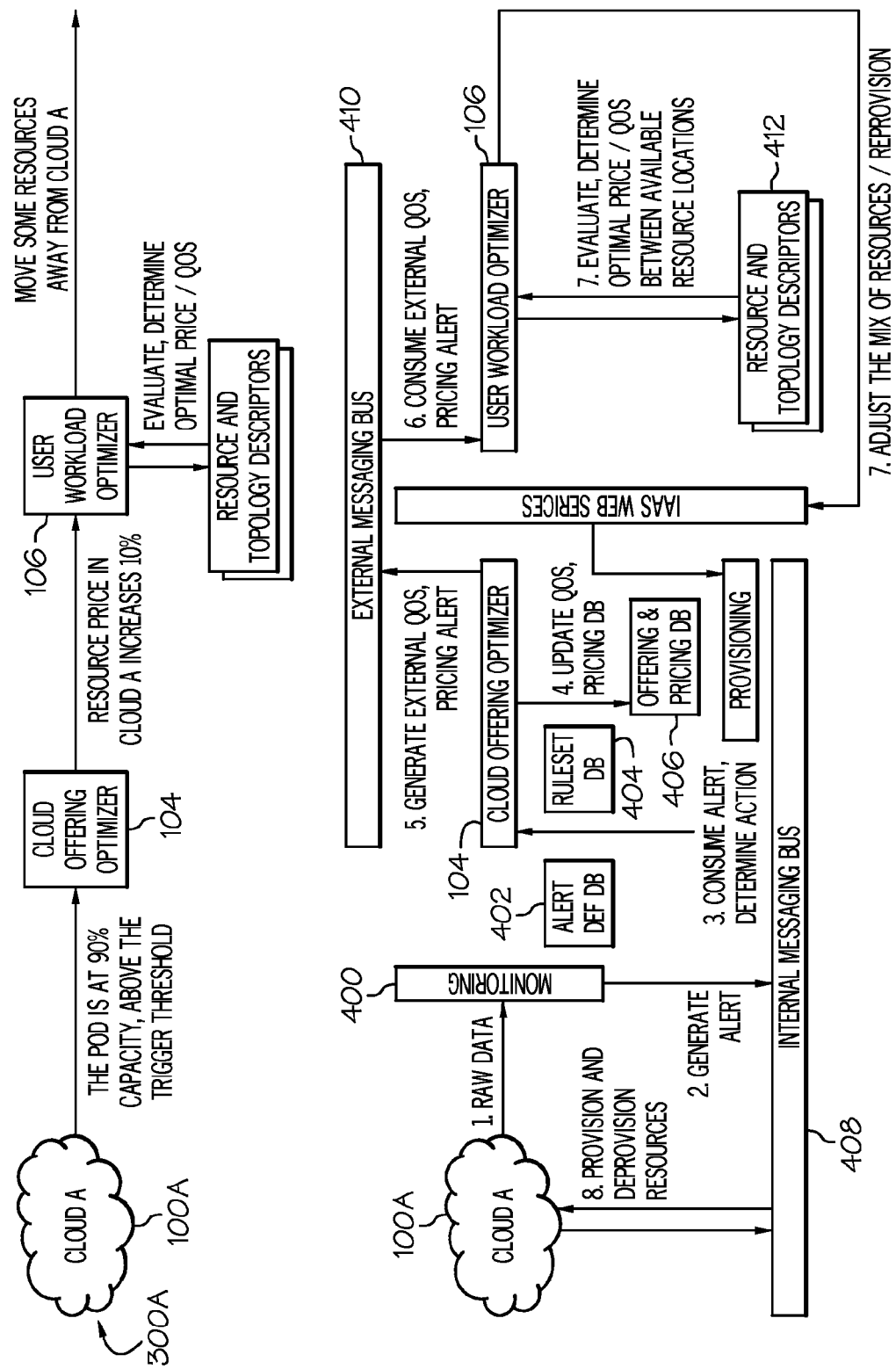
FIG. 8 depicts a diagram of a cloud offering optimizer and a user workload optimizer working in conjunction with one another according to an embodiment of the present invention.

FIG. 8 illustrates additional details describing the interaction between cloud offering optimizer 104 and the user workload optimizer 106 when a cloud pod 100A is nearing its capacity, which affects the price of its resources and, ultimately, entails a change in application topology. Specifically, FIG. 8 further describes the steps involved with process flow 300A of FIG. 7. As shown:

1. Raw monitoring data may enter an internal monitoring module 400 and, when run against a rule-set database 404, may result in an alert event "Capacity over 90%" (e.g., as generated from an alert definition database 402).
2. The alert may be placed on an internal cloud pod message queue/bus 408.
3. Cloud offering optimizer 104 may receive the alert, consult rule set database 404, and determine that in response to this event the VM prices should increase by 10%.
4. Cloud offering optimizer 104 may further update an offering and pricing database 406, which immediately changes the pricing available to the cloud users through, for example, a IaaS web services layer.
5. In addition, cloud offering optimizer 104 may create an external alert indicating the price change. This external alert may be placed on an external message queue/bus 410, which is readable by external customers of the cloud pod.
6. User workload optimizer 106 may receive/observe this alert event. User workload optimizer 106 may evaluate the event against the constraints database of resource and topology descriptors 412 and may determine that some resources need to be moved away from this cloud pod.
7. User workload optimizer 106 may further contact the Infrastructure as a Service (IaaS) web service and issue one or more de-provisioning requests. Upon submission, user workload optimizer 106 updates its database of resource and topology descriptors 412.
8. The IaaS service updates its database of resource and topology descriptors and submits requests accordingly.

It may be noted the above flow is described as event-based, for efficiency. However, this flow may be implemented iteratively as well, as not every change to the overall environment may result in an event.

Figure 9:
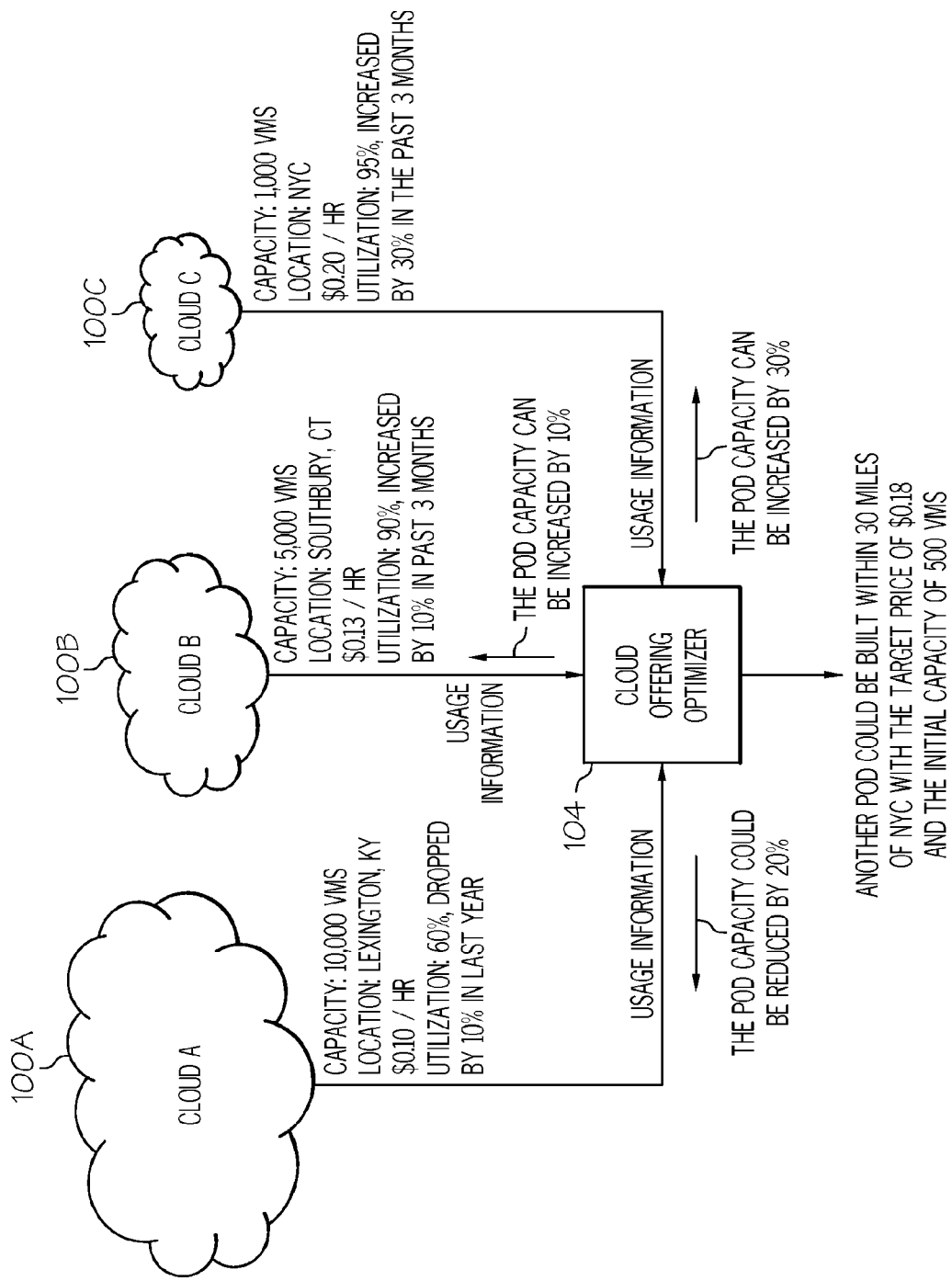
FIG. 9 depicts a long term planning use case according to an embodiment of the present invention.

FIG. 9 illustrates an example of a workflow associated with whether cloud pods 100A-C should be changed (e.g., increased or decreased) in size, whether a capacity of cloud pods 100A-C should change, whether cloud pods 100A-C should be brought on-line, whether additional locations should be opened, etc. Under embodiments of the present invention, these issues may be addressed by providing corresponding capacity, location, utilization information, etc., to cloud offering optimizer 104, which may determine a reallocation plan such as changing cloud pod capacity (cloud pods 100A and 100C) and/or opening another cloud pod with a particular price and/or capacity.

Figure 10:
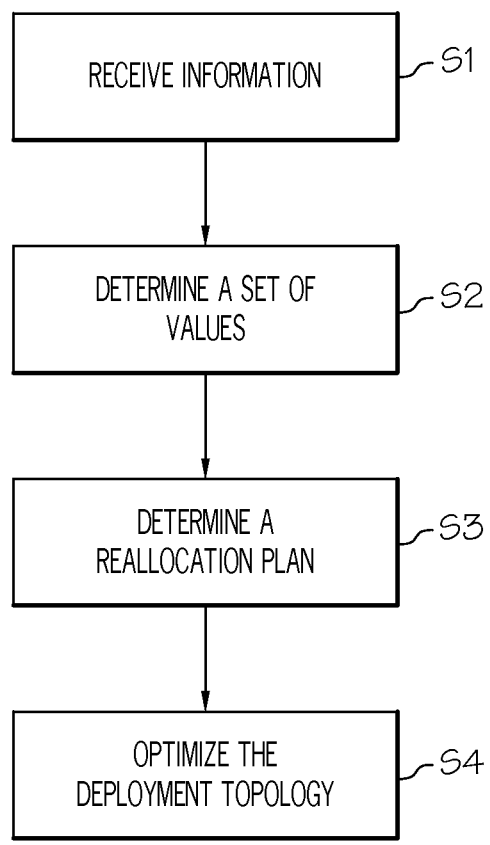
FIG. 10 depicts a method flow diagram according to an embodiment of the present invention The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

Referring now to FIG. 10, a method flow diagram according to an embodiment of the present invention is shown. As depicted, in step S1, information is received in a computer memory medium pertaining to a set of resource events having a potential to affect a set of service factors for a set of computing resources distributed among a set deployment groups of the networked computing environment. In step S2, a set of values is determined for the set of service factors based on the information and a deployment topology of the set of computing resources among the set of groups of the networked computing environment. In step S3, a reallocation plan for the set of computing resources among the set of deployment groups to optimize the set of values is determined. In step S4, the deployment topology may be optimized based on the reallocation plan and a set of application events corresponding to a set of applications utilized to process a set of workloads received by the networked computing environment.

While shown and described herein as a service factor optimization solution, it is understood that the invention further provides various alternative embodiments. For example, in one embodiment, the invention provides a computer-readable/useable medium that includes computer program code to enable a computer infrastructure to provide service factor optimization functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide service factor optimization functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for service factor optimization. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for optimizing service factors for computing resources in a networked computing environment, comprising:

receiving information in a computer memory medium pertaining to a set of resource events having a potential to affect a set of service factors for a set of computing resources distributed among a set of deployment groups of the networked computing environment, each deployment group in the set of deployment groups having a plurality of jointly managed hardware elements and having a set of values reflecting a required quality of service and a required price point that is specific to the deployment group that must be met by every computing resource in the deployment group;

revising the set of values for the set of service factors based on the information and a deployment topology of the set of computing resources among the set of deployment groups;

searching the deployment group for any computing resources in the deployment group that do not meet the revised set of values for the set of service factors;

determining a reallocation plan for the set of computing resources to optimize the set of values by moving at least one resource whose requirements are no longer met by a current deployment group to a new deployment group; and optimizing the deployment topology based on the reallocation plan and a set of application events corresponding to a set of applications utilized to process a set of workloads received by the networked computing environment.

2. The computer-implemented method of claim 1, the networked computing environment comprising a cloud computing environment, the set of computing resources comprising a set of cloud computing resources, and the set of deployment groups comprising a set of cloud pods.

3. The computer-implemented method of claim 1, the information being based on at least one of the following: a set of historical data stored in a computer storage device, or the set of workloads.

4. The computer-implemented method of claim 1, the set of service factors comprising at least one of the following: a price, or a quality of service (QoS) associated with utilization of the set of computing resources.

5. The computer-implemented method of claim 1, the set of values being optimized for particular locations of the networked computing environment.

6. The computer-implemented method of claim 1, the reallocation plan comprising a reallocation of at least one computing resource of the set of computing resources within a particular deployment group of the set of deployment groups.

7. The computer-implemented method of claim 1, the reallocation plan comprising a reallocation of at least one computing resource of the set of computing resources from a first deployment group to a second deployment group.

8. A system for optimizing service factors for computing resources in a networked computing environment, comprising:
    a memory medium comprising instructions;
    a bus coupled to the memory medium; and
    a processor coupled to the bus that when executing the instructions causes the system to:
        receive information in a computer memory medium pertaining to a set of resource events having a potential to affect a set of service factors for a set of computing resources distributed among a set of deployment groups of the networked computing environment, each deployment group in the set of deployment groups having a plurality of jointly managed hardware elements and having a set of values reflecting a required quality of service and a required price point that is specific to the deployment group that must be met by every computing resource in the deployment group;
        revise the set of values for the set of service factors based on the information and a deployment topology of the set of computing resources among the set of deployment groups;
        search the deployment group for any computing resources in the deployment group that do not meet the revised set of values for the set of service factors;
        determine a reallocation plan for the set of computing resources to optimize the set of values by moving at least one resource whose requirements are no longer met by a current deployment group to a new deployment group; and
        optimize the deployment topology based on the reallocation plan and a set of application events corresponding to a set of applications utilized to process a set of workloads received by the networked computing environment.

9. The system of claim 8, the networked computing environment comprising a cloud computing environment, the set of computing resources comprising a set of cloud computing resources, and the set of deployment groups comprising a set of cloud pods.

10. The system of claim 8, the information being based on at least one of the following: a set of historical data stored in a computer storage device, or the set of workloads.

11. The system of claim 8, the set of service factors comprising at least one of the following: a price, or a quality of service (QoS) associated with utilization of the set of computing resources.

12. The system of claim 8, the set of values being optimized for particular locations of the networked computing environment.

13. The system of claim 8, the reallocation plan comprising a reallocation of at least one computing resource of the set of computing resources within a particular deployment group of the set of deployment groups.

14. The system of claim 8, the reallocation plan comprising a reallocation of at least one computing resource of the set of computing resources from a first deployment group to a second deployment group.

15. A computer program product for optimizing service factors for computing resources in a networked computing environment, the computer program product comprising a computer readable storage device, and program instructions stored on the computer readable storage device, to:
    receive information in a computer memory medium pertaining to a set of resource events having a potential to affect a set of service factors for a set of computing resources distributed among a set of deployment groups of the networked computing environment, each deployment group in the set of deployment groups having a plurality of jointly managed hardware elements and having a set of values reflecting a required quality of service and a required price point that is specific to the deployment group that must be met by every computing resource in the deployment group;
    revise the set of values for the set of service factors based on the information and a deployment topology of the set of computing resources among the set of deployment groups;
    search the deployment group for any computing resources in the deployment group that do not meet the revised set of values for the set of service factors;
    determine a reallocation plan for the set of computing resources to optimize the set of values by moving at least one resource whose requirements are no longer met by a current deployment group to a new deployment group; and
    optimize the deployment topology based on the reallocation plan and a set of application events corresponding to a set of applications utilized to process a set of workloads received by the networked computing environment.

16. The computer program product of claim 15, the networked computing environment comprising a cloud computing environment, the set of computing resources comprising a set of cloud computing resources, and the set of deployment groups comprising a set of cloud pods.

17. The computer program product of claim 15, the information being based on at least one of the following: a set of historical data stored in a computer storage device, or the set of workloads.

18. The computer program product of claim 15, the set of service factors comprising at least one of the following: a price, or a quality of service (QoS) associated with utilization of the set of computing resources.

19. The computer program product of claim 15, the set of values being optimized for particular locations of the networked computing environment.

20. The computer program product of claim 15, the reallocation plan comprising a reallocation of at least one computing resource of the set of computing resources within a particular deployment group of the set of deployment groups.

21. The computer program product of claim 15, the reallocation plan comprising a reallocation of at least one computing resource of the set of computing resources from a first deployment group to a second deployment group.

22. A method for deploying a system for optimizing service factors for computing resources in a networked computing environment, comprising:
   providing a computer infrastructure being operable to:
      receive information in a computer memory medium pertaining to a set of resource events having a potential to affect a set of service factors for a set of computing resources distributed among a set of deployment groups of the networked computing environment, each deployment group in the set of deployment groups having a plurality of jointly managed hardware elements and having a set of values reflecting a required quality of service and a required price point that is specific to the deployment group that must be met by every computing resource in the deployment group;
      revise the set of values for the set of service factors based on the information and a deployment topology of the set of computing resources among the set of deployment groups;
      search the deployment group for any computing resources in the deployment group that do not meet the revised set of values for the set of service factors;
      determine a reallocation plan for the set of computing resources to optimize the set of values by moving at least one resource whose requirements are no longer met by a current deployment group to a new deployment group; and
      optimize the deployment topology based on the reallocation plan and a set of application events corresponding to a set of applications utilized to process a set of workloads received by the networked computing environment.

* * * * *